June 26, 1956   N. S. CURTIS ET AL   2,751,851
APPARATUS FOR CONVEYING ARTICLES
Filed Sept. 10, 1952   2 Sheets-Sheet 1

INVENTOR.
NORMAN S. CURTIS &
BY ROBERT C. JUVINALL

Harry E Downer
Attorney

June 26, 1956  N. S. CURTIS ET AL  2,751,851
APPARATUS FOR CONVEYING ARTICLES
Filed Sept. 10, 1952  2 Sheets-Sheet 2

INVENTOR.
NORMAN S. CURTIS &
ROBERT C. JUVINALL
BY
Harry L. Downer
Attorney

United States Patent Office 2,751,851
Patented June 26, 1956

2,751,851

APPARATUS FOR CONVEYING ARTICLES

Norman S. Curtis and Robert C. Juvinall, Indianapolis, Ind., assignors to Ransburg Electro-Coating Corp., Indianapolis, Ind., a corporation of Indiana Application September 10, 1952, Serial No. 308,856

4 Claims. (Cl. 104—93)

This invention relates to improvements in apparatus for conveying a series of articles along a predetermined path and particularly to means for varying the spacing between articles thus conveyed.

Continuously moving conveyors are in common use for carrying articles of manufacture over a predetermined path past a number of stations for the successive processing of the articles. It is frequently desirable that the articles be more intimately or more widely spaced along one portion of the path than along other portions. It may also be desirable that the articles be partially turned or indexed at a specified point on the path in order that different surfaces of the articles be presented for processing along a succeeding portion of the path. If such a change in spacing or indexing of the articles is performed abruptly the inertia of the moving articles and their supports may cause swinging, swaying, or other inter-article movement as the articles move for a considerable distance along their path. Such inter-article movement is often commercially objectionable especially where the articles are so closely spaced that movement will cause adjoining articles to strike each other and perhaps dent, chip or otherwise damage the articles. Apparatus which is positively controlled for effecting a gradual or incrementally varying change in the spacing between articles being conveyed and thus eliminate undesirable inter-article movement has been broadly described in the co-pending application of James W. Juvinall, Serial No. 289,333, previously filed May 22, 1952.

To provide the desired variations in spacing between articles at certain stations or along predetermined portions of the article path, it is often required that the article and a portion of the article supporting structure be transferred from the main conveyor track to an auxiliary track where propelling means separate and distinct from the propelling means employed along the main conveyor track might be used to obtain the desired variations in article spacing. This procedure necessitates the use of complicated and expensive article-transferring mechanisms for transferring articles from one conveyor track to another and, in addition, necessitates the use of an auxiliary conveyor track and an auxiliary propelling mechanism.

The primary object of our invention is to provide improved and highly efficient means for varying the spacing between articles being moved without transferring the articles from one conveyor track to another. By employing our invention a conventional conveyor system may be simply and economically modified to provide for wider or closer than normal spacing of articles at designated stations along the article path and/or for indexing during such a period of wider than normal spacing. One of the most common types of apparatus for moving articles, which may be modified by our invention, comprises an I beam track positioned over the desired path for the articles, a series of trolleys having rollers which ride on the upper surface of the lower flange of the track, article supporting structure connected to each trolley, and a power-driven flexible member such as a cable or chain. The trolleys are normally affixed, with a uniform spacing between them, to the power-driven flexible member which thus moves the trolleys in succession and at the same speed along the track each carrying an article supporting structure and an article. Such apparatus may be modified in accordance with our invention by connecting an adjustment member to each of the trolleys. This adjustment member may take the form of a pivotable arm which on engagement with a suitable cam will cause a continuous incremental variation in the forward speed of the article as it moves along a substantial portion of the path, thus to either increase or decrease the spacing between articles as desired.

Another object of our invention is to provide an improved article support for supporting articles being carried on a moving conveyor.

Still another object is to provide a simple and economical means for varying the spacing between articles carried on a conveyor by positive and controlled means.

A still further object is to provide an improved indexing means for indexing articles being moved along a predetermined path.

One further object is to provide improved means for moving a series of articles along a predetermined path at an incrementally varying rate.

Improved apparatus for accomplishing the foregoing and related objects is hereinafter fully described with reference to the accompanying drawings wherein.

Figure 1:
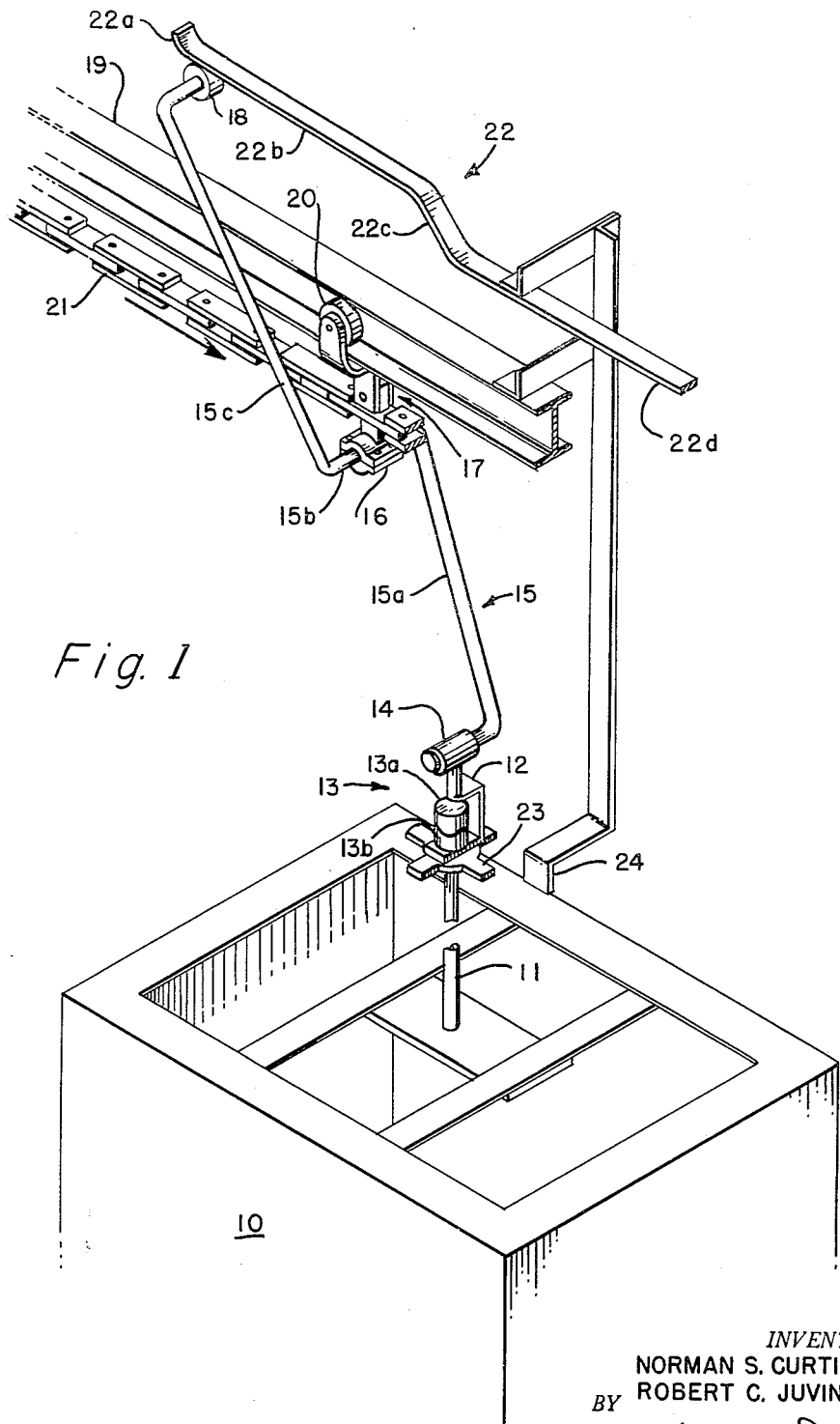
Fig. 1 is a perspective view, somewhat in cross section, showing a preferred embodiment of our invention.
Figure 2:
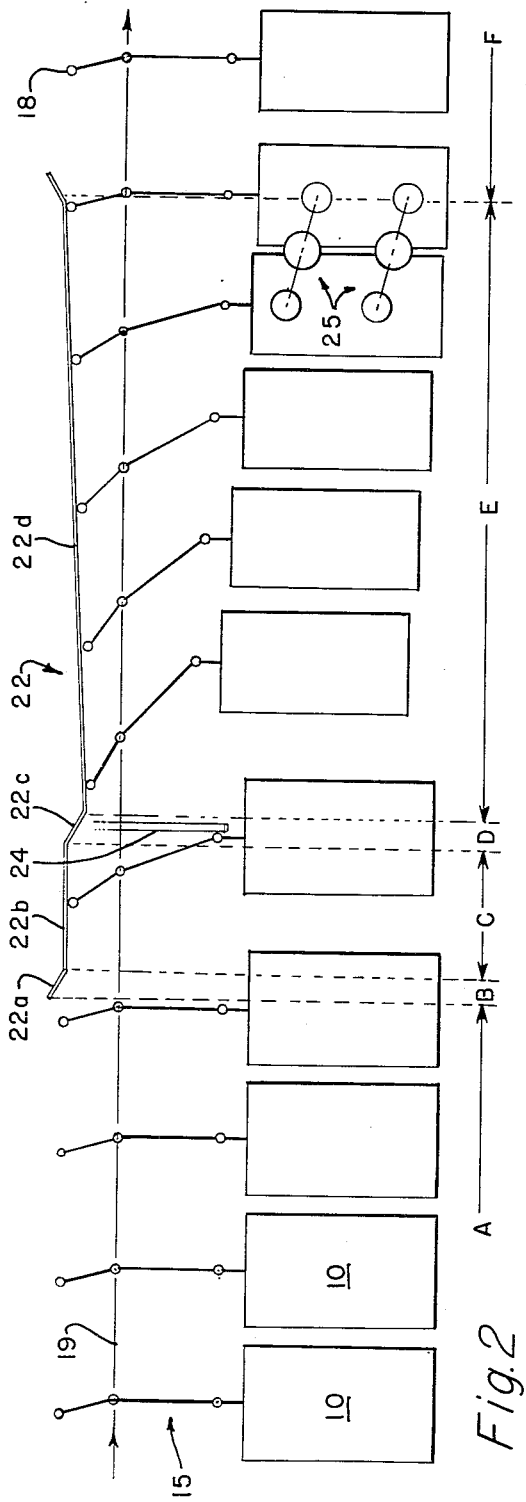
Fig. 2 is a diagrammatic elevation showing the utilization of the apparatus illustrated in Fig. 1 for coating articles.

Figs. 1 and 2 show apparatus for spacing and indexing a series of articles along a single conveyor track. While our invention is capable of being used in various conveyor systems conveying articles which vary widely in size and shape, in the embodiment shown in Figs. 1 and 2 and now to be described the articles are rectangular in plan view. It is assumed the articles are first carried along the conveyor track with the two widest sides of each rectangular article parallel to the line of conveyor movement and facing outwardly for processing. It is further assumed that the spacing between successive articles along this first portion of the conveyor is sufficiently small so as to prohibit the rotation or indexing of successive articles about their centers without bumping or contact between adjacent articles. Such close spacing may be desired in order to present the articles closely spaced for certain processing such as, for example, spray coating where wide spacing between articles would cause the loss of considerable coating material which would otherwise be wasted by being projected into the empty spaces between adjacent articles. If such close spacing is employed to permit coating of the two widest sides of rectangular articles or for other reasons, the spacing between articles must be increased before indexing them 90° to permit the presentation of the two narrower sides for subsequent spray coating. After indexing the articles, it is apparent that the distance between articles will be considerably less since the two narrower of the four sides of the rectangular articles will then be facing outwardly. Therefore, apparatus must be provided which will first increase the spacing between successive articles in order to permit the articles to be indexed 90° and which will then decrease the spacing to less than normal in order to provide the necessary closely spaced articles for the second spray coating process.

Article 10 is one of a succession of identical articles individually supported and uniformly spaced along a predetermined path. Article 10 is rigidly supported on an article support 11 which is rotatably suspended from bracket 12. Upper segment 13a of positioning cam 13 is affixed to the upper end of support 11 while lower segment 13b is mounted on bracket 12. Bracket 12 is pivotally mounted at bearing 14 on the end of lower segment 15a of spacing adjustment arm 15. Spacing adjustment arm 15 is journaled at its center segment 15b within bearing 16 which is connected to the lower portion of trolley 17 so that arm 15 may pivot about its center segment 15b in a vertical plane parallel to the path of article movement. The upper segment 15c of arm 15 extends upwardly beyond trolley 17 and carries cam follower 18 which is rotatably mounted about the upper end of segment 15c.

Trolley 17, to the lower end of which bearing 16 is rigidly affixed, moves along conveying track 19 on a plurality of rollers 20 and is propelled by connection to chain 21 which is driven from a convenient source of power (not shown). Cam 22 is positioned over a substantial portion of track 19 and has a face which is at a varying distance above track 19. Cam 22 comprises four segments along which the angle between the face of cam 22 and track 19 may vary. The face of segment 22a is rather sharply inclined in relation to track 19 and makes a substantial angle with the line of conveyor movement which opens in the direction opposite to the path of travel of trolley 17. The face of segment 22b is substantially parallel to conveyor track 19. The face of segment 22c, like that of 22a, is sharply inclined in relation to the conveyor track and forms a substantial angle with the line of conveyor movement which opens in the opposite direction from the direction of travel of trolley 17. Segment 22d, which overlies the coating zone, is the longest of the four segments and the face of the cam along this segment is slightly inclined with conveyor track 19 and forms a slight angle with the line of conveyor movement which opens in the direction of travel of trolley 17.

A four-toothed cam wheel 23 is rigidly and concentrically secured to article support 11. Indexing arm 24 positioned cooperatively with cam wheel 23 is mounted on track 19 as shown in Fig. 1. The articles are indexed by cam wheel 23 striking arm 24 and after indexing the article will be held in position by positioning cam 13.

In order to conveniently describe the operation of the apparatus, the path of travel of trolley 17 has been divided into a succession of zones from A through F as shown in Fig. 2. In the operation of the apparatus chain 21 propels trolley 17 through zone A wherein spacing adjustment arm 15 is in a substantially vertical position so that article support 11 is directly beneath trolley 17. As previously stated, trolleys 17 are uniformly spaced along track 19 so that while spacing adjustment arm is vertical, as in zone A, there will be a uniform close spacing between articles 10 being successively conveyed.

As trolley 17 enters zone B, follower 18 will engage the face of segment 22a of cam 22. The face of segment 22a, inclined as previously described, is positioned so that it lies somewhat closer to conveyor track 19 than does follower 18 in its normal upstanding position. As trolley 17 moves beneath segment 22a through zone B and a first segment of zone C propelled at a uniform speed by chain 21, cam follower 18 will be forced downwardly. As follower 18 is depressed into a lower than normal position, arm 15 will be caused to pivot about its center section 15b within bearing 16 so that its lower segment 15a will swing forward in an arc about center segment 15b. This will cause bearing 14, bracket 12, and also article support 11 to be propelled forward somewhat ahead of trolley 17.

As trolley 17 enters zone C wherein indexing will take place, it will be seen that article 10 has advanced considerably ahead of the next succeeding article by reason of the additional forward movement given to the article by the pivoting of spacing adjustment arm 15. Segment 22b of cam 22 is of such length that while cam follower 18 is traversing segment 22b (zone C), the cam follower immediately preceding the follower in zone C has already entered zone D, so as to impart an additional forward movement to the article which precedes the present article within the indexing zone. Therefore, there will be sufficient spacing both to the front and rear of article 10 while follower 18 is within zone C to permit indexing the article 90°.

In the indexing of articles, one of the teeth of cam wheel 23 strikes the face of indexing arm 24 as trolley 17 moves through indexing zone C. This causes cam wheel 23, support 11, upper segment 13a of positioning cam 13 and article 10 to rotate 90° from their former positions. Article 10 is subsequently maintained in its indexed position by means of positioning cam 13.

As cam follower 18 enters zone D it will be further depressed as it engages the face of segment 22c of cam 22. This will cause arm 15 to again pivot about its center section 15b so that lower segment 15a will swing forward and cause article support 11 to be propelled further forward ahead of trolley 17. As cam follower 18 enters zone E it will engage the face of cam segment 22d which is slightly inclined along the length of zone E. Thus, as follower 18 moves along segment 22d, the distance between track 19 and cam 22 will gradually increase so that lower segment 15a of arm 15 will pivot downwardly permitting trailing articles to "catch up" and in effect cause a decrease in the spacing between successive articles. This decrease in spacing may bring the articles closely enough together in order to permit certain types of processing such as spray-coating of the two outwardly facing sides of each article. Such spray-coating may be accomplished by the use of six electrostatic spray heads 25 arranged cooperatively on each side of track 19 as shown in Fig. 2.

As the face of cam 22 rises above track 19 to a height greater than the length of segment 15c of arm 15, it will be apparent that no further contact will be had between follower 18 and the face of cam 22. Thereupon, the articles will continue along conveyor track 19 with arm 15 in its normal vertical position and with uniform spacing between adjacent articles.

Figure 3:
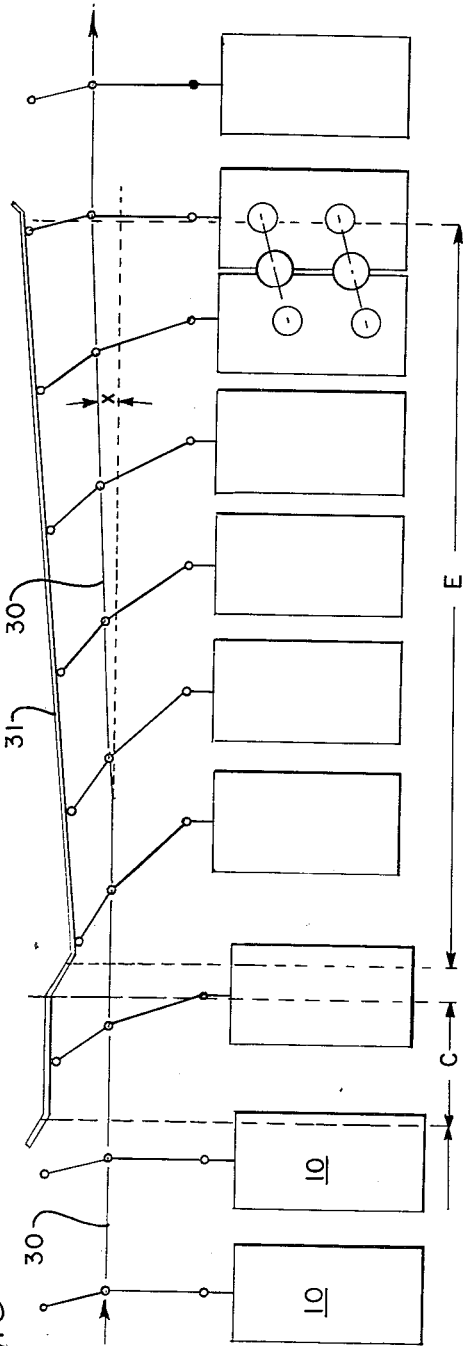
Fig. 3 is a diagrammatic elevation of another form of our invention being used for the spray coating of articles.

Fig. 3 shows a further embodiment of our invention, somewhat similar to the embodiment shown in Fig. 2, except that after indexing of the articles has taken place in zone C, conveyor track 30 ascends at a slight angle X to the horizontal throughout processing zone E. This angle of ascent X is equal to the angle of descent of articles 10 within zone E where the conveyor track is horizontal, as shown in Fig. 2. The included angle between track 30 and the face of cam 31 lying above the track may remain the same as in the embodiment shown in Fig. 2, thus keeping the articles, as they traverse coating or other processing zone E, at a constant horizontal level and in a closely spaced position. The keeping of the articles at a constant level and without "steps" between adjacent articles as are shown in Fig. 2 may be desired in order that the spray-coating of the articles or other processing may be more conveniently carried out without having to compensate for a series of "steps" between adjacent articles.

For convenience of illustration the paths of tracks 19 and 30 and cams 22 and 31 in zone E have been shown as straight, i. e. with a constant angle to the horizontal throughout the entire length of zone E. It will be apparent to those skilled in the art that the distance between the track and the cam and their respective paths can be arranged so that a processing zone of considerable distance is maintained wherein the articles are kept with a constant uniform spacing between them and so that excessive swinging and swaying of articles in closely bunched arrangement is greatly reduced. This may require a somewhat curved path for both the cam and the conveyor track, but the specific curvatures and path distances will depend upon such factors as the design of the adjustment arms, the length of the desired processing zone, and the desired degree of grouping of the articles.

While various modifications and adaptations may be made in relation to our invention, there has been shown in the drawings and herein described two specific embodiments with the understanding that the detailed description is an exemplification of the principles of the invention and is not intended to limit the invention to the embodiments disclosed. The scope of the invention is fully pointed out in the following claims.

We claim:

1. An article conveying apparatus comprising a generally horizontal conveyor track, a plurality of trolleys movable along said track, means for propelling said trolleys in fixed spaced relation along said track, a plurality of rigid adjustment arms each pivotally mounted at a point between its ends on a trolley and pivotally carrying at its lower end an article support, and an article-positioning cam spaced from and extending along a predetermined portion of said conveyor track, said cam having an extended cam surface adapted to engage the upper portion of said adjustment arms as the arms move on said trolleys along said predetermined track portion to change the position of said adjustment arms and thereby to vary the horizontal spacing between successive article supports moving along said track portion.

2. An article conveying apparatus comprising a conveyor track, a plurality of trolleys movable along said track, means for propelling said trolleys in fixed spaced relation along said track, a plurality of rigid adjustment arms each pivotally mounted at a point between its ends on one of said trolleys, a plurality of article hangers each pivotally mounted on the lower end of one of said adjustment arms and adapted to support a depending article, and a cam positioned generally above a predetermined portion of said track and having a cam surface adapted to engage the upper end of each adjustment member as the trolley on which said adjustment is mounted traverses said predetermined track portion to move said adjustment member about said trolley and thereby to change relative to said trolley the position of the article depending from the article hanger mounted on the lower end of said adjustment member.

3. An article conveying apparatus comprising a conveyor track extending along a predetermined path, a series of trolleys adapted to move along said conveyor track, means for propelling said trolleys in fixed relation along said conveyor track, a series of rigid elongated adjustment members each pivotally mounted on one of said trolleys, a series of article supports each pivotally mounted on one of said adjustment members and adapted to carry an article, and an article-positioning cam adjacent to a portion of said conveyor track adapted to engage the adjustment members of successive trolleys as they move along said conveyor track portion to pivot said adjustment members and thereby to vary the spacing between successive article supports and articles moving along said conveyor track portion.

4. An article conveying apparatus comprising a conveyor track extending along a generally horizontal path, a cam having a cam surface extending above a predetermined portion of said track, the vertical distance from said cam surface to said track being fixed but varying along the extent of said surface, a series of trolleys adapted to move along said track, means for moving said trolleys in spaced relation along said track, a plurality of rigid elongated adjustment arms each mounted at a point between its ends on one of said trolleys, and a plurality of article hangers each pivotally mounted on the lower end of one of said adjustment arms and each carrying a depending article, each associated adjustment arm and article hanger depending substantially vertically from their trolley as the trolley is moved along that portion of the track remote from said cam, and the upper end of said adjustment arm arranged to bear against the cam surface as its trolley is moved beneath said cam whereby the adjustment arm is inclined from its otherwise vertical position and its inclination is determined by the distance from the cam surface to said track to effect a change in the horizontal spacing between adjacent article hangers and articles as their trolleys move beneath said cam.

References Cited in the file of this patent

UNITED STATES PATENTS

| 761,610 | Riblet | May 31, 1904 |
| 1,917,836 | Haddlesay | July 11, 1933 |
| 2,078,503 | Meiser | Apr. 27, 1937 |
| 2,572,011 | Cohen et al. | Oct. 23, 1951 |
| 2,619,916 | Rainier | Dec. 2, 1952 |
| 2,634,851 | Steinhoff | Apr. 14, 1953 |